United States Patent [19]

Tonellato

[11] Patent Number: 4,528,999

[45] Date of Patent: Jul. 16, 1985

[54] PRESSURE RELIEF DEVICE FOR PIPES

[75] Inventor: Sylvain Tonellato, Houilles, France

[73] Assignee: Fuller Company, Bethelehem, Pa.

[21] Appl. No.: 579,839

[22] Filed: Feb. 13, 1984

[30] Foreign Application Priority Data

Feb. 18, 1983 [FR] France .................................. 83 02724

[51] Int. Cl.³ ...................... F16K 17/04; F16K 17/14
[52] U.S. Cl. ..................................... 137/70; 137/511;
137/515; 137/527; 138/103; 251/212; 285/3;
285/373
[58] Field of Search ................. 137/70, 511, 515, 527,
137/535; 138/92, 94.3, 94.5, 100, 103; 251/212;
285/3, 373, 419

[56] References Cited

U.S. PATENT DOCUMENTS

| 952,938 | 3/1910 | Pannenborg | 138/92 |
| 2,899,984 | 8/1959 | Gaffin | 285/373 X |
| 2,918,941 | 12/1959 | Whiting | 138/92 |
| 3,186,744 | 6/1965 | Smith | 285/373 |

Primary Examiner—Robert G. Nilson
Attorney, Agent, or Firm—Frank H. Thomson

[57] ABSTRACT

A pressure relief device for pneumatic conveying lines to serve as a safety device in the event of an explosion or sudden pressure increase within the conveying line. The device includes a pair of semi-cylindrical shells normally joined together by a shear pin or pressure sensitive key which ruptures when excessive pressure in the conveying line exerts excessive force on the shell sections. When the joining device ruptures, the shell sections open up to relieve line pressure. A suitable mounting arrangement is provided including guide bars for the shells, bumpers and spring return arrangement.

10 Claims, 10 Drawing Figures

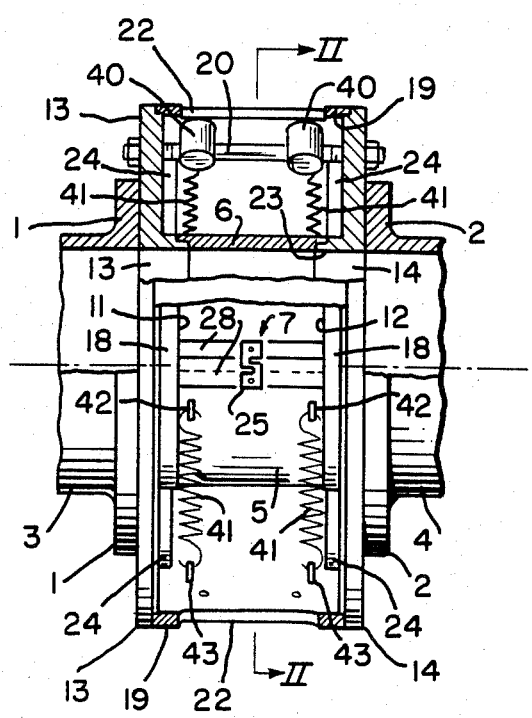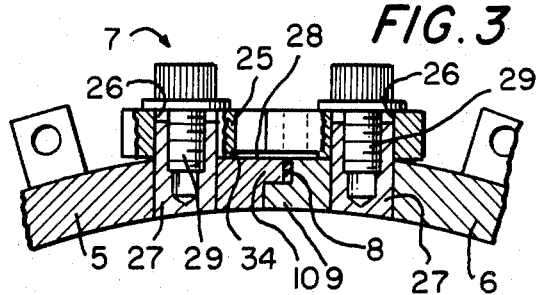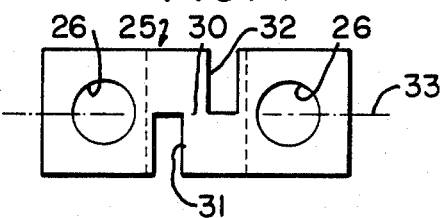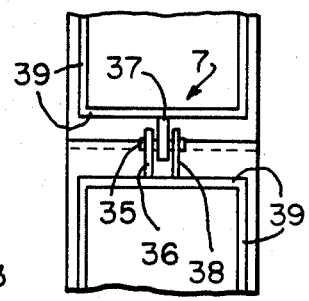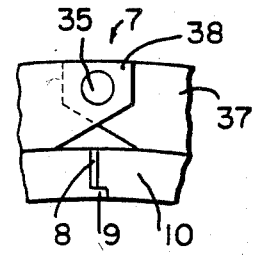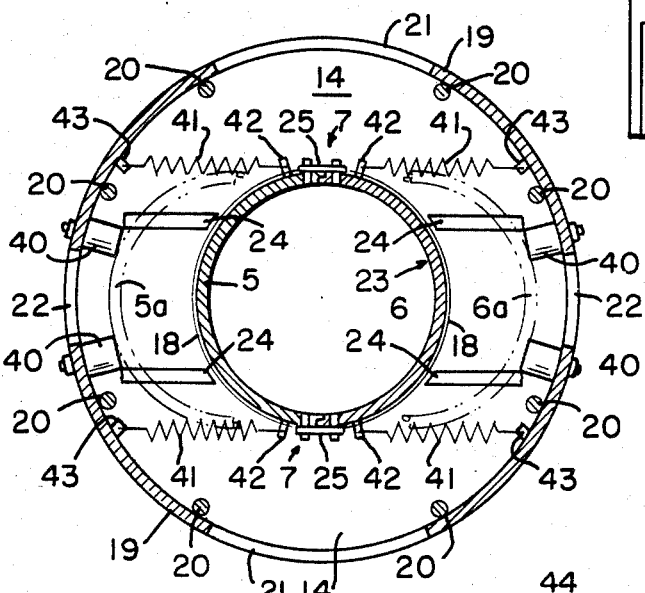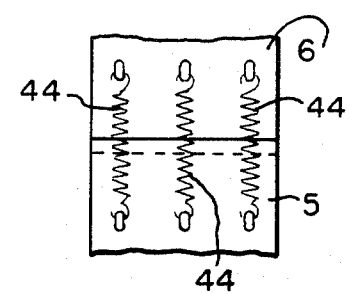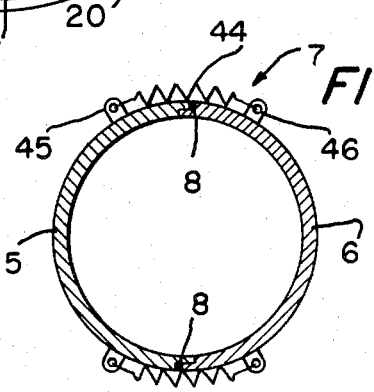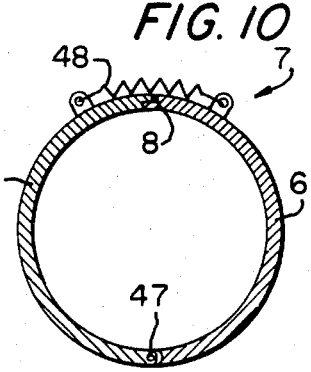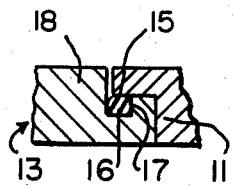

PRESSURE RELIEF DEVICE FOR PIPES

This invention relates to an overpressure limiter or pressure relief device for pipes intended for the pneumatic transport of powdery, flammable or explosive bulk substances, for example, flour or coal transported by compressed air, such pipes being made up of a series of tubes presenting one and the same inside diameter and connected in an end-to-end manner by suitable clamps.

It is particularly important that pipes of this kind—in which combustion or explosion of the transported powdery substance can take place, comprise at least one safety device intended to open up so as to allow the escape of the combustion gases before the accidental overpressure, caused by such combustion or explosion, can damage the pipes or injure personnel who may be in the vicinity.

In this field we presently know overpressure limiters which are mounted in a bypass on the pipes and which include a membrane that will be torn open in the event of a sudden intense pressure or a valve that will be opened due to the action of accidental overpressure, thus enabling the combustion gases to escape without damaging the pipes. But these known devices can be mounted only as a bypass of the pipes and their presence causes disturbances in the circulation of the material being transported and dangerous accumulations of material in the bypass.

This invention is directed toward remedying these inconveniences by providing an overpressure limiter which can be mounted in the conveying pipes so that it will not cause any disturbance in the flow of products and so that it will not cause any accumulation of material in the proximity of its position.

According to the invention, the overpressure limiter for a pipe of the above-mentioned type is interposed in series between the clamps of two adjacent pipes of the conveying line and essentially comprises two semi-cylindrical shells arranged with the inside faces toward each other, which shells are capable of moving away from each other due to a substantial increase in pressure and kept stuck together in a tight fashion by means of a junction device with calibrated resistance to respond by opening when exposed to excessive pressure. The two shells form a cylinder whose two ends are placed in a tight manner between two transversal side plates, each presenting a circular opening, respectively attached upon said clamps and held, with respect to each other, by crossbars, the inside diameter of the cylinder and of the side plates have substantially the same inside diameter as the conveying pipes.

Other features and advantages of this invention will emerge better from the following description, given here with respect to the attached drawings where:

FIG. 1 is a longitudinal outside view with cross-sections and partial cutaway portions of the limiter according to the invention;

FIG. 2 is a transversal cross-section view of the limiter along line II—II in FIG. 1;

FIG. 3 shows, on an enlarged scale, a view with partial cross-sections of a preferred version of the junction device linking the shells of the limiter;

FIG. 4 is a top view of the small plate of the junction device shown in FIG. 3;

FIG. 5 is a partial axial cross-section view of the sealing joint between the hoop and a side plate of the limiter;

FIGS. 6 and 7 respectively show a partial longitudinal view and a partial end view of the shells linked by a modified invention;

FIGS. 8 and 9 respectively represent a partial longitudinal view and a transversal cross-section view of the shells linked by a third form of the invention; and FIG. 10 represents a cross-section view of the shells joined by a fourth form of the invention.

In these drawings, the same reference numbers refer to the same parts.

Referring now to the figures, an overpressure limiter or pressure relief device according to the invention is interposed in series between clamps 1 and 2 of two consecutive pipes 3 and 4 of a conveying line intended for the pneumatic transport of powdery, flammable or explosible bulk substances, such as flour or coal in the powdery state, transported by compressed air, and consequently capable of causing accidental overpressures that are liable to damage the piping or injure personnel. The conveying line is made up of a series of pipes, such as tubes 3 and 4, presenting the same inside diameter and linked together, in an end to end manner on the level of their end clamps, such as clamps 1 and 2.

According to an essential feature of the invention, the limiter comprises two semi-cylindrical shells 5 and 6, arranged with their inside faces opposite each other, the shells are capable of moving away from each other due to the effect of excessive pressure such as might be caused by an explosion or combustion within the conveying line. The shells are normally stuck together in a tight fashion by at least one junction device 7 of the calibrated resistance type. The device 7 is mounted on the outside faces of the shells 5 and 6 and is capable of responding to excessive pressure within the pipes 1 and 2.

Preferably, the two shells 5 and 6 each include two longitudinal flat bearing surfaces which are diametrically opposite to each other and coplaner. A flat joint 8 is arranged between the bearing surfaces opposite the joined shells. To facilitate the placement of the shells and of the joint, one of the bearing surfaces of each shell includes a shoulder 9, intended to cooperate with a groove 10 having a complementary shape, made on the level of the other bearing surface of the opposite shell. Considering such shoulders and grooves, it must be noted that the shells 5 and 6 can be perfectly identical and can each present a bearing surface with shoulder and a bearing surface with groove, or they can be dissimilar, with one of the shells comprising two bearing surfaces with shoulders and the other comprising two bearing surfaces with grooves.

According to another essential feature of the invention, the two joined shells 5 and 6 form a hoop or sleeve whose two circular ends 11 and 12 are placed in a tight fashion between two transversal side plates 13 and 14. Preferably, each end 11 or 12 of the hoop formed by the shells 5 and 6 includes a short cylindrical side plate 15 (FIG. 5), consisting of two semi-cylindrical halves, each of which corresponds obviously to one of the shells 5 and 6 is applied toward the inside against an O-ring seal 16 housed in a ring-shaped recess 17, the latter being made in a cylindrical bossing 18, made on the associated member 13 or 14 or being an integral part of the latter. A seal is thus formed between the hoop formed by shells 5 and 6 and the members 13 and 14.

Furthermore, it is clear that the transversal sideplates 13 and 14 are, respectively, attached to clamps 1 and 2, in the known manner, for example, by means of screws not illustrated and longitudinally transversing the clamp and engaging with the associated groove. According to the invention, the sideplates 13 and 14 are furthermore kept in position with respect to each other by crossbars. In case the grooves are circular, the crossbars can comprise a cylindrical crown 19, wedged between the edges of the plates and tie-rods 20, arranged peripherally in the proximity of the crown and linking the plates. Such a cylindrical crown 19 must be perforated to permit the evacuation of the overpressure gases coming from combustion or accidental explosion of the substance transported in the piping and escaping thus when the shells move away from each other. For this purpose, crown 19, which is illustrated in a partial outside view by way of indication in FIG. 1, including large openings 21, shown in FIG. 2, and made to the right of the junction device or devices 7 and possibly openings 22 with a smaller cross-section, illustrated in FIGS. 1 and 2 and made between the big openings 21.

Besides, the transversal members 13 and 14 each present a circular opening 23 which is also made in the associated bossing 18 and, according to yet another essential feature of the invention. Openings 23 of members 13 and 14 and the opening of the hoops formed by the two stuck-together shells 5 and 6 present the same inside diameter as tubes 3 and 4 of the piping, so that the inside faces of the hoop, of the openings of the side plates, and of the tubes will not present any break in continuity with respect to the flow of the powdery substance. As a result, the pressure relief device of the present invention does not have any internal shoulders or flanges which can produce a pressure drop or back pressure build up within the conveying line. In addition the absence of projections, shoulders, or grooves within the relief device resists material build up within the device..

Preferably, the two stuck-together shells 5 and 6 have their flat bearing surfaces arranged in one and the same plane and are kept in position by two junction devices 7 which are mounted in diametrically opposite positions essentially on the level of said bearing surfaces, the side plates 13 and 14, on either side of their bossing 18, comprising guide members 24, such as section-steel pieces welded upon the side plates, which are arranged perpendicularly to said plane, and which are intended to cooperate with the shells when they move apart from each other due to the effect of an excessive pressure caused by the inflammation or explosion of the substance transported in the piping.

More precisely, the shells 5 and 6, can be identical, as indicated above, and they can have their bearing surfaces stuck together along a vertical plane, while the guide members 24 are then arranged horizontally, so that the shells can move away from each other laterally.

According to a preferred form of implementation, the two junction devices 7 are of the sudden rupture type and each comprise a small plate 25 arranged transversely astride on the stuck-together shells 5 and 6, on the level of their flat bearing surfaces facing each other, and attached by one of their ends to each of the shells. For example, each end of the small plate 5 comprises an opening 26 intended to be mounted on a stud or spur 27 which is set in the shell, in the proximity of its flat bearing surface and on the level of a flat surface 28 of the latter and which can include a screw 29 for retaining the small plate.

Plate 25 includes a central portion 30 forming a calibrated test cube intended to work essentially by shearing and delimited by two parallel slits or notches 31 and 32, cut in opposite directions perpendicularly to the symmetry axis 33 of the small plate and displaced with respect to each other along that axis, the small plate furthermore in its lower portion presenting a middle transversal cavity.

According to a second version, the two junction devices 7 are also of the sudden rupture type and each comprise a calibrated pin 35 intended to work by pure shearing arranged longitudinally above the joined shells, on the level of their flat bearing surfaces facing each other and inserted in attachment members belonging, respectively, to the two shells. Three neighboring and coaxial rings 36, 37, 38, having substantially the same inside diameter essentially corresponding to the outside diameter of the pin 35 are arranged perpendicularly to the flat bearing surfaces, the central ring 37 is secured or forms part of one of the shells while the two end rings 36 and 38 are secure or form part of the other shell. The rings are integral with the outside peripheral ribs which forms part of the shell with which it is associated.

It should be noted that, in the two above-mentioned versions of the junction devices 7, the latter are, for example, made up of small plates 25 or pins 35 which undergo abrupt ruptures almost simultaneously due to the effect of an accidental overpressure developiing in the piping, the rupture of one of the devices—on the level of the other diametrically opposed device—bringing about a slight rotation which, combined with the push due to the overpressure, causes the immediate rupture of the latter. The junction devices are designed so that they will rupture upon the application of a specific force. For example, in one application the device 7 could be sized so that rupture occurs when te pipeline is exposed to say 150 psi while in another application the device 7 could be designed so that rupture occurs when the pipeline is exposed to say 250 psi. The rupture of the junction devices obviously has the effect or releasing the shells which can then move away from each other, freely sliding between the guide members 24, the overpressure gases thus released can escape between the crossbars or through the openings 21 or 22 of the cylindrical crown 19. During the release of the shells, to avoid an excessively abrupt impact between the latter and the crossbars, the limiter can comprise shock-absorbing buffers 40 and, possibly, antirebound springs 41, each intended to cooperate with the two shells 5 and 6 when they move away from each other due to the effect of overpressure. The buffers 40 can be attached upon crossbars, especially on the inside face of the cylindrical crown 19, in the prolongation of the guide members 24 and, in the case where we use a cylindrical crown, on either side of the small openings 21 which can facilitate the evacuation of the air driven out by the abrupt opening of the shells. The anti-rebound springs 41 preferably are arranged essentially parallel to the guide members 24 and can have a end attached to the shells, especially to a flap 42, attached to the shell in the proximity of its flat bearing surface, and the other end being attached to the crossbars or to the side plates, especially to a flap 43 attached upon the inside face of the cylindrical crown 19.

With this arrangement, when the semi-cylindrical shells 5 and 6 move away from each other due to the effect of overpressure having caused the rupture of the junction devices 7, they come to abut against the shock-absorbing buffers 40 and they are rapidly immobilized against the latter due to the effect of the antirebound springs 41, thus occupying the position illustrated in phantom and labeled, respectively, with 5a and 6a in FIG. 2.

It should be noted that, in the two versions described earlier, regarding the junction devices 7, the rupture of the small plate 24 or of the pin 35 means a destruction which requires manual replacement of the small plate or of the pin to restore the limiter to its proper state according to the invention.

Consequently, it may be worthwhile to make a limiter for which it is not necessary to make any manual restorations. According to a third version, the two junction devices 7 are of the progressive opening type with automatic reclosing and each comprises at least one elastic connection member arranged transversally astride upon the stuck-together shells 5 and 6, on the level of their flat bearing surfaces facing each other, of which each of the ends can be connected to one of the shells. For example, each of the junction devices 7 can comprise two or three identical springs 44, mounted parallel between outside flaps 45 and 46, belonging, respectively, to the two shells, said springs working in an extension manner when the shells move apart due to the action of accidental overpressure, the power of the springs obviously being calculated as a function of the overpressure contemplated, the shock-absorber buffers 40 and the anti-rebound springs 41 being eliminated while the guide members 24 can be preserved advantageously. Furthermore, it must be noted that one of the shells may be made fixed, for example, it may be made in one piece with the transversal side plates 13 and 14, in which case the common plane of the flat bearing surfaces is not necessarily vertical but can advantageously be horizontal, the fixed shell being arranged preferably below the mobile shell so as to use the inherent weight of the latter to facilitate the reclosing of the limiter.

According to a fourth version, the junction device 7 is also of the progressive-opening and automatic re-closing type and comprises a fixed longitudinal articulation axis 47, linking the two shells 5 and 6 on the level of their flat bearing surfaces situated on one side of the hoop and a recovery member such as a counterweight (not illustrated) or one or several springs 48 linking said shells at the level of their flat bearing surfaces situated on the other side of the hoop. It should be noted that the articulation axis can be situated above the assembly so as to use the inherent weight of the shells to relieve the spring or springs 48, it being understood that the straight-line guide members 24 are eliminated and can possibly be replaced by circular-arc guide members centered on the articulation axis 47. In case one of the shells is made fixed, it may be worthwhile to arrange it essentially below the other shell but is may be desirable to tilt it in such a fashion that the articulation axis will be placed higher than the springs so as to use the inherent weight of the mobile to facilitate the limiter's re-closing.

It is of course understood that this invention was described and illustrated here only by way of explanation and without any restrictions and that one could make any useful modification in it, especially in terms of technical equivalences, without going beyond its framework.

I claim:

1. A pressure relief device for piping intended for pneumatic transport of powdery bulk substances capable of causing accidental excessive pressures and made up of a series of pipes having the same inside diameter and linked together, end to end by end clamps, the relief device characterized by being interposed in series between adjacent end clamps of two consecutive pipes and that it comprises two semi-cylindrical shells arranged with their inside faces toward each other, capable of moving away from each other due to the effect of excessive pressure in the piping and kept joined together in a tight manner by at least one junction device with calibrated resistance which junction device will open in the event of excessive pressure, said junction device being mounted on the outside faces of said shells; the two joined shells forming a hoop whose two circular ends are placed in tight fashion between two transversal side plates, each having an opening and being attached to said clamps and held in spaced apart relation to each other by crossbars, the openings of the hoop and of the side plates presenting the same inside diameter as the transport pipes.

2. A pressure relief device according to claim 1 characterized by the two shells each comprising two flat longitudinal and diametrically opposed and coplaner bearing surfaces, a flat joint is arranged between the opposite bearing surfaces of the joined shells, one of the bearing surfaces of each shell being capable of presenting a shoulder intended to cooperate with a groove having a complementary shape and made in the other bearing surface of the shell facing it.

3. A pressure relief device according to claim 1 characterized by each end of the hoop comprises a short cylindrical bearing surface made up of two semi-cylindrical halves, each of which corresponds to one of the shells and is applied toward the inside against an O-ring seal housed in a ring-shaped recess in a cylindrical boss on the associated side plate and in which a circular opening is perforated.

4. A pressure relief device according to claim 1, characterized by the two joined shells having their flat bearing surfaces arranged in substantially the same plane and are retained by two junction devices mounted in diametrically opposed positions essentially on the level of said bearing surfaces and that the side plates, on either side of their boss comprise guide members arranged perpendicularly to said plane and cooperate with the shells when the shells move away from each other due to the effect of excessive pressure in the transport pipe.

5. A pressure relief device according to claim 4 characterized by the fact that two junction devices are of the sudden rupture type and each comprise a plate arranged transversally astride the joined shells, on the level of two flat bearing surfaces facing each other; each of said junction devices being attached by one of its ends to each of the shells, and comprising a central portion forming a calibrated test member, delimited by two parallel notches, cut perpendicularly to the symmetry axis of the plate and displaced with respect to each other along said axis.

6. A pressure relief device according to claim 5, characterized by shockabsorber buffers and anti-rebound springs which cooperate with each of the two shells when said shells move apart from each other due to the effect of excessive pressure, the buffers being being attached upon the crossbars in the guide members and the anti-rebound springs having one end attached to the shells and the other end attached to the crossbars.

7. A pressure relief device according to claim 4 characterized by the fact that the two junction devices are of the sudden rupture type and each comprise a shear pin arranged longitudinally above the joined shells on the level of two flat bearing surfaces facing each other, and inserted in attachment members respectively secured to the two shells.

8. A pressure relief device according to claim 7, characterized by shockabsorber buffers and anti-rebound springs which cooperate with each of the two shells when said shells move apart from each other due to the effect of excessive pressure, the buffers being being attached upon the crossbars in the guide members and the anti-rebound springs having one end attached to the shells and the other end attached to the crossbars.

9. A pressure relief device according to claim 4 characterized by the two junction devices being of the progressive opening and automatic re-closing type and each comprise at least one elastic connection member such as a spring arranged transversely astride the joined shells, on the level of flat bearing surfaces facing each other, two ends of said connection being connected to the two shells.

10. A pressure relief device according to claim 1 characterized by the junction device is of the progressive opening and automatic re-closing type and comprises a longitudinal fixed articulation axis linking the two shells on the level of their flat portions situated on one side of the hoop and a recovery member linking them on the level of the flat bearing surfaces of the shells and positioned on the other side of the hoop.

* * * * *